United States Patent Office 3,347,811
Patented Oct. 17, 1967

3,347,811
PROCESS FOR PREPARING AQUEOUS DISPERSIONS OF ETHYLENE COPOLYMERS
Thomas C. Bissot, Grand Island, N.Y., assignor to E. I. du Pont de Nemours and Company, Wilmington, Del., a corporation of Delaware
No Drawing. Filed Feb. 2, 1965, Ser. No. 429,909
3 Claims. (Cl. 260—29.6)

This invention relates to aqueous dispersions of ethylene copolymers, and more particularly to processes for preparing storage-stable aqueous dispersions of ethylene copolymers.

Aqueous dispersions of ethylene copolymers are well known in the art. Heretofore, such dispersions have been most commonly prepared by emulsion polymerization techniques. However, emulsion polymerization processes for ethylene copolymers have several disadvantages. Common comonomers such as vinyl acetate and vinyl chloride tend to hydrolyze during emulsion polymerization. Therefore, the conditions under which these monomers can be polymerized to high molecular weight in the presence of water is severely limited. Also, such emulsion polymerization processes require the use of high pressures, which poses severe equipment limitations. First, the equipment must be built so as to withstand the necessary high pressures. Furthermore, the presence of water in such high pressure equipment is conducive to corrosion. Moreover, the preparation of aqueous dispersions of such ethylene copolymers by emulsion polymerization techniques greatly lowers the capacity of such equipment compared to bulk or solution polymerization.

The post-dispersion of preformed ethylene copolymers eliminates these problems. However, previous workers in the art have either failed to obtain stable high solids dispersions or else have required large amounts of surfactants to prepare stable dispersions by post-dispersion techniques. The presence of large amounts of surfactants in the dispersions deleteriously affects important properties in films prepared therefrom, such as, water sensitivity and adhesion of the films to various substrates.

An object of the present invention is to provide an improved process for the preparation of aqueous dispersions of ethylene copolymers. Another object is to provide an improved process for the preparation of storage-stable aqueous dispersions of ethylene copolymers containing only small amounts of surfactants. A further object is to provide a post-dispersion process for the preparation of storage-stable aqueous dispersions of ethylene copolymers containing only small amounts of surfactants.

These and other objects are fully attained by the present invention which provides the process for preparing a storage-stable aqueous dispersion of an ethylene copolymer comprising:

(a) Dissolving a copolymer comprising 30 to 95% by weight copolymerized ethylene and 5 to 70% by weight of at least one copolymerized polar monomer in a sufficient amount of a water-immiscible organic solvent having a boiling point of 40 to 160° C. to form a solution having a viscosity of 10 to 5000 centipoise measured at 60° C.;

(b) Emulsifying said solution in a mixture of water containing a dissolved surfactant having an HLB number of at least 18, the amount of surfactant being 1 to 5% based on the weight of said copolymer; and thereafter, (c) Evaporating said solvent from the resulting emulsion.

This invention provides a significant contribution to the art in providing a post-dispersion technique for preparing aqueous dispersions of ethylene copolymers, thereby eliminating the inherent problems associated with the more common emulsion polymerization techniques. Furthermore, this invention provides a post-dispersion technique which produces storage-stable dispersions of ethylene copolymers which contain surprisingly small amounts of surfactants, and thus overcomes the deleterious features of the prior art post-dispersion techniques.

The polymers which are operable in the practice of this invention comprise 30 to 95% by weight copolymerized ethylene and 5 to 70% by weight of at least one comonomer having polar characteristics, such as vinyl acetate, methacrylic acid, acrylic acid, methyl methacrylate, ethyl acrylate, vinyl chloride, vinyl alcohol (i.e., hydrolyzed vinyl acetate), and the like. Copolymers of ethylene and vinyl acetate are particularly suitable in this invention. Preferably, such ethylene/vinyl acetate copolymers contain 60 to 82% by weight of copolymerized ethylene and 18 to 40% by weight of copolymerized vinyl acetate. Terpolymers of ethylene containing vinyl acetate and methacrylic acid wherein the methacrylic acid content is from 2 to 10% by weight, and the combined vinyl acetate and methacrylic acid content is from 28 to 40% by weight are also preferred copolymers. The copolymers used in this invention are generally prepared by high pressure free-radical catalysis processes, but copolymers prepared by low pressure coordination catalysis processes are also suitable. The molecular weight of these copolymers may be varied over a wide range. However, the copolymers preferably have molecular weights corresponding to a melt index of from 3 to 150 as determined by ASTM D–1238–52T.

In the practice of this invention, the copolymer is dissolved in an organic solvent. The organic solvent selected for use in this invention must be capable of dissolving the ethylene copolymer. Also, the solvent must be immiscible with water. Furthermore, the solvent must have a boiling point of 40° to 160° C., or preferably in the range of 80° to 120° C. If the boiling point is higher than the specified temperature, the azeotrope will contain a large proportion of water relative to the solvent, making it necessary to add large additional quantities of water in order to remove the solvent in the evaporation step described hereinafter. If the boiling point is too low it is extremely difficult to effect the proper emulsification, as described below, because of resulting cavitation in the liquid phase. Preferably, the solvent forms an azeotrope with water which contains at least about 60% by volume of the organic solvent. The preferred solvents for use in this invention are toluene, xylene, trichloroethylene and chloroform. Other suitable solvents include benzene, cyclohexane, methyl cyclohexane, carbon tetrachloride, perchloroethylene, butyl acetate, amyl acetate, and the like.

The viscosity of the copolymer solution is critical to this invention. It has been found that the copolymer must be dissolved in a sufficient amount of the water-immiscible organic solvent to form a solution having a viscosity of 10 to 5000 centipoise measured at 60° C. If the viscosity exceeds 5000 centipoise, the resulting polymer dispersion is not adequately storage-stable, and also the coating and film forming characteristics of the dispersion are deleteriously affected. Solutions having a viscosity of less than 10 centipoise require large amounts of surfactant to obtain emulsification. It has also been discovered that the preparation of solutions having viscosities within the narrow range of from 100 to 200 centipoise at 60° C. provide the best balance between small particle size in the resulting polymer dispersion, and solvent requirements. The actual concentration of the copolymer in the solvent depends on the molecular weight of the polymer and the nature and density of the solvent.

Thereafter, the copolymer solution is emulsified in water. It is critical to this invention that the surfactant, described below, be dissolved in the water prior to this emulsification. The selection of the surfactant for use in this invention is also critical. It has been found that only those surfactants having an HLB number of at least 18 are operable in this invention. The HLB system (Hydrophil-Lypophil-Balance) is a common classification scheme described in several references, for example, Griffin, Journal of the Society of Cosmetic Chemists, Vol. 1, p. 311 (1949). The surfactant may be cationic or anionic in nature. However, the nonionic surfactants do not have the requisite HLB number, and therefore are not operable in this invention. From this information, selection of a suitable surfactant is within the ordinary skill of the art. Satisfactory surfactants include sodium dodecyl sulfate, cetyl trimethyl ammonium bromide, N-cetyl-N-ethyl morpholinium ethosulfate, N-soya-N-ethyl morpholinium ethosulfate, the sodium and potassium sulfates of straight chain fatty alcohols containing from 10 to 18 carbon atoms, the sodium and potassium salts of $C_{16}$ to $C_{18}$ fatty acids, particularly the unsaturated acids such as oleic, linoleic and ricinoleic acids, the sodium and potassium salts of natural carboxylic acids such as sodium rosinate and sodium tallate, and the like. Whereas the prior art post-dispersion techniques require relatively large amounts of surfactants for use in the preparation of ethylene copolymer aqueous dispersions, on the order of up to about 35% based on the weight of the copolymer, the present invention surprisingly requires only about 1 to 5% surfactant based on the weight of copolymer. In most instances, only about 3% of the surfactant based on the weight of copolymer is required to obtain a satisfactory aqueous dispersion.

The amount of water used may be varied over a wide range, but for practical purposes, it is desirable to use the minimum amount which will avoid phase inversion during emulsification. Generally, this minimum amount is within the range of about 30 to 40% by volume of the combined polymer solution and water phases. The manner in which the copolymer solution phase and water phase are initially mixed is not critical, but the preferred procedures are to either add the copolymer solution phase slowly to the water phase during emulsification, or to add the entire water phase to the copolymer solution phase prior to the start of emulsification.

The emulsification of the copolymer solution in the water phase can be accomplished in any convenient manner, using any of the commercially available machines designed for emulsification. The emulsification may be conducted in either a continuous or a batch process. When a batch operation is employed, the emulsification machine is operated for about 5 to 30 minutes, depending on the particle size desired and the efficiency of the particular emulsification machine used. The emulsification should be conducted at a temperature of at least 10° to 20° C. below the solvent-water azeotrope temperature for efficient operation of the emulsification machine.

After the resulting emulsion is formed, the water immiscible solvent is then removed by evaporation. This evaporation may be accomplished in any of the well-known techniques in the art, using either vacuum or near atmospheric conditions. The film type evaporator employing a stream of inert gas is suitable for this evaporation. Normally, the evaporation is conducted until all of the water immiscible solvent is removed, thus leaving copolymer particles of very small size dispersed in the water phase. The evaporation may be continued to remove excess water thereby obtaining a dispersion of any desired solids content. The process of this invention is ideally suitable to prepare aqueous dispersions having a high solids content, on the order of 50 to 65% by weight of copolymer. Although generally all of the organic solvents are completely removed by the evaporation, in some instances it is desirable to have some residual solvent remain in the dispersion to function as a fugitive plasticizer for the copolymer. For this purpose a high boiling solvent is used in whole or in part in the initial polymer solution. Examples of such high boiling solvents which are suitable for this purpose are xylene, tetralin and decalin.

Troublesome foaming is sometimes encountered during the evaporation step because of the presence of surfactants. However, restricting the evaporation to the surface of the liquid and avoiding boiling inside the liquid completely eliminates the foaming. Foaming can also be repressed by using the familiar commercial silicone antifoaming agents, or by use of a mechanical foam breaking device.

The process of this invention can be used to co-disperse other materials together with the ethylene copolymers if desired. A large variety of natural or synthetic oils and resins can be coemulsified in this manner, for example, boiled and raw linseed oil, coumarone-indene hydrocarbon resin, wood or tall oil rosin, nitrocellulose, paraffin wax, halogenated paraffin waxes, and the like.

Another useful application of this invention is the partial alcoholysis of an ethylene/vinyl acetate copolymer to obtain an aqueous dispersion of an ethylene/vinyl acetate/vinyl alcohol terpolymer. This is readily accomplished by adding a precalculated amount of methanol with sodium methoxide catalyst to the copolymer solution prior to emulsification.

The ethylene copolymer dispersions of this invention have many uses in the paper, textile, paint, and related arts. The principal advantages over hot melts or solutions of these polymers is their much lower application viscosity and elimination of the fire and toxicity hazards associated with solvent systems. In the paper industry, for example, these dispersions have use as vapor barriers, subcoats for other coating such as polyvinylidene chloride, heat sealable coatings, adhesives and beater additives. In the textile industry, these dispersions are useful as sizing, thread finishing and lubrication, waterproofing and binders for nonwoven fabrics.

This invention is further illustrated by the following examples.

*Example 1*

To 66.1 pounds of toluene, was added 16.5 pounds of an ethylene/vinyl acetate copolymer containing 33% by weight vinyl acetate and having a melt index of 25. This mixture was agitated for 15 minutes to assure complete solution of the polymer. The viscosity of this solution was 100 centipoises at 60° C. In a separate vessel, the water phase was prepared by dissolving 0.49 lb. of sodium dodecyl sulfate ("Duponol" ME) which has an HLB number of 40, and 0.16 of sodium oleate in 56.2 lb. of distilled water. This water phase was added to the toluene-copolymer solution in an emulsifying mill (Model O Kady Mill, manufactured by the Kinetic Dispersion Corp. of Buffalo, N.Y.). The mill was run for 30 minutes to obtain a complete emulsion of the toluene-copolymer solution. The emulsion was then transferred to an evaporator, which consisted of a jacketed 50 gal. vessel equipped with a stirrer and a mechanical foam breaker at the top of a vapor take-off line. An azeotrope of toluene and water was distilled off at slightly below atmospheric pressure followed by a quantity of clear water until the content of the evaporator analyzed at 55% by weight solids. The resulting product was a solvent-free dispersion of the ethylene/vinyl acetate copolymer in water. This dispersion had an average particle size of approximately 0.5 micron with no particles larger than 2 microns as determined by optical and electron microscopes. The product had good storage-stability showing only slight creaming after 2 months. The dispersion also possessed a high degree of stability towards mechanical shearing forces as evidenced by its ability to resist any change after 10 minutes of high shear in a Waring Blendor.

*Example 2*

The procedure of Example 1 was repeated substituting 16.5 lb. of an ethylene/vinyl acetate/methacrylic acid terpolymer containing 28% vinyl acetate and 5% methacrylic acid and having a melt index of 35–40, for the ethylene/vinyl acetate copolymer used therein. The solution viscosity was 320 centipoise at 60° C. After concentration of the terpolymer emulsion by evaporating off the toluene and excess water, there was obtained a stable small particle size dispersion of the ethylene/vinyl acetate/methacrylic acid terpolymer containing 55% by weight solids. This product also showed a high storage-stability and resistance to mechanical stress, and also pH changes. This dispersion dried to a clear continuous film and had attractive properties as subcoat for polyvinylidene chloride barrier coatings on paper.

A total of 65 lb. of xylene and 4 lb. of Decalin were charged to the emulsifying mill used in Example 1. The mill was started, and thereafter 16.5 lb. of an ethylene/vinyl acetate copolymer containing 40% by weight vinyl acetate and having a melt index of 40, was added to the solvent mixture. The mill was run for about 15 minutes to assure complete solution of the polymer. The viscosity of the polymer solution was approximately 100 centipoise at 60° C. In a separate vessel, 0.33 lb. of sodium oleate (HLB number of 18) and 0.33 lb. of polyoxyethylated octyl phenol containing 8 to 10 ethylene oxide units ("Triton" X–100, used in this Example to reduce foaming) was dissolved in 72.8 lb. of distilled water. This was then added to mill and the emulsification was conducted as in Example 1. The emulsion was then transferred to the evaporator vessel and concentrated under vacuum not allowing the temperature to exceed 25° C. The evaporation of solvents and water was continued until the solids analysis of the product was 50–55% by weight. The resulting dispersion contained 12% by volume of residual solvent composed of a mixture of Decalin and xylene. The dispersion dried at 25° C. to a strong extensible film which was nearly identical in physical properties to films of the same polymer cast from organic solvents. This product also displayed good storage-stability and had a small particle size.

*Example 4*

Following the procedure described in Example 1, a solution of 66.1 lb. of toluene and 16.5 lb. of an ethylene/vinyl acetate copolymer containing 18% by weight vinyl acetate and having a melt index of 150 was prepared. In a separate vessel, 1.90 lb. of a commercial cationic surfactant which was a 35 weight percent aqueous solution of N-cetyl-N-ethyl morpholinium ethosulfate ("Atlas G–263") which has an HLB number of greater than 30, and 5 grams of sodium hydroxide pellets were dissolved in 55.1 lb. of distilled water. The emulsification and evaporation were carried out as described in Example 1 to yield a dispersion of a copolymer in water. This product had a small particle size and good storage-stability. However, this dispersion prepared with a cationic surfactant was inferior in mechanical stability as compared to dispersions prepared with anionic surfactants.

*Example 5*

To a 4-liter glass resin kettle, equipped with an efficient stirrer, a thermometer well and a reflux condenser, and heated by a hot water bath, was charged 2125 grams of toluene, 23.25 grams of a refined wood rosin (commercial abietic acid, Newport Industries) and 500 grams of an ethylene/vinyl acetate copolymer containing 33% by weight vinyl acetate and having a melt index of 25. This mixture was agitated at 80° C. for 30 minutes to obtain a complete solution having a viscosity of 130 centipoise at 60° C. In a separate vessel having approximately a two gallon capacity, a solution of 3.0 grams of sodium hydroxide in 1700 grams of distilled water was prepared. A model L–1 Eppenbach Homomixer was placed into this 2 gallon vessel. With this disperser running at a low speed, the polymer and wood rosin solution was slowly added to the water phase. The sodium hydroxide reacted with part of the wood rosin to form sodium rosinate which functioned as the surfactant. Sodium rosinate has an HLB number of greater than 18. The disperser was operated for 20 minutes. The emulsion was then transferred to a 5-liter round bottom flask which in turn was placed on a rotating laboratory film evaporator. The solvent and part of the water was evaporated to obtain a stable small particle size dispersion containing 51.7% solids. This dispersion showed excellent storage-stability and mechanical stability.

*Example 6*

Following the procedure described in Example 1, a solution was prepared consisting of 57 lbs. of toluene, 19 lbs. of an ethylene/vinyl acetate copolymer containing 28% by weight vinyl acetate and having a melt index of 15, and 19 lbs. of a chlorinated paraffin wax containing 40% by weight chlorine ("Chlorowax LV"). The solution viscosity was 400 centipoise at 60° C. The emulsion was prepared using a water phase consisting of 0.95 lb. of sodium dodecyl sulfate ("Duponol" ME) in 65 lbs. of distilled water. The emulsion was then subjected to a vaporation and concentration to 55% solids. Coatings formed from this dispersion displayed an extraordinarily high coefficient of friction and was useful as a skid-proof backing for rugs.

*Example 7*

Into a 4-liter glass resin kettle equipped with an efficient stirrer, a thermometer and a condenser was placed 2100 grams of toluene and 500 grams of an ethylene/vinyl acetate copolymer containing 33% by weight vinyl acetate and having a melt index of 25. This kettle was then heated with a heating mantle to 110° C. while stirring until 100 grams of toluene was distilled off. This procedure was followed to insure removal of traces of all water from the system. The resulting water-free solution of the copolymer was then cooled to 30° C. and a solution of 2 grams of sodium methoxide in 42 grams of absolute methyl alcohol was added. After holding the temperature at 30° C. for 90 minutes, 10.5 grams of oleic acid was added to neutralize the sodium methoxide catalyst. This toluene solution was then emulsified with a water phase consisting of 15 grams of sodium dodecyl sulfate ("Duponol" ME) in 1700 grams of distilled water, as described in Example 5. The resulting emulsion was then evaporated and concentrated as shown in Example 5 to obtain a dispersion containing 46.8% by weight solids. The resulting product was a stable small particle dispersion of a polymer which analyzed as a composition of 74% ethylene, 16% vinyl acetate and 10% vinyl alcohol.

*Example 8*

A solution consisting of 372 grams of toluene, 41 grams of chloroform and 150 grams of a terpolymer of 31.7% ethylene, 63.6% methyl methacrylate and 4.7% methacrylic acid (the terpolymer having an inherent viscosity of 0.22) was prepared by charging these ingredients to a 2 liter glass resin kettle equipped with a stirrer, thermometer and condenser. This kettle was then heated to reflux, with stirring, until the polymer was completely in solution. This polymer solution was emulsified with 600 grams of water containing 6 grams of sodium dodecyl sulfate ("Duponol" ME) and 7 grams of 28% ammonium hydroxide, following the procedure shown in Example 1. The solvents were then evaporated as in Example 1 to yield a small particle size polymer dispersion containing 46.7% by weight solids.

*Example 9*

A solution of an ethylene/methyl methacrylate copolymer having a methyl methacrylate content of 19.8% by weight and a melt index of 3.7 was prepared by dissolving 375 grams of the copolymer in 2125 grams of toluene. The viscosity of this solution was approximately 200 centipoise at 60° C. This polymer solution was emulsified in 1700 grams of distilled water containing 18.75 grams of sodium dodecyl sulfate ("Duponol" ME) and 1.5 grams of sodium carbonate. The emulsification and evaporation was conducted as shown in Example 5. A mechanically and storage-stable dispersion, containing 55% solids, was obtained.

*Example 10*

Example 9 was repeated, using in place of the copolymer shown therein, an ethylene/methyl methacrylate copolymer containing 28.3% by weight of methyl methacrylate and having a melt index of 7.2. A stable dispersion containing 52% solids was obtained.

*Example 11*

This example illustrates the results obtained when a surfactant having a HLB number of less than 18 is used. A solution of an ethylene/vinyl acetate copolymer having a vinyl acetate content of 40% and a melt index of 40 was prepared by dissolving 150 grams of the copolymer in 600 grams of toluene. The viscosity of this solution was approximately 100 centipoise at 60° C. This solution was then emulsified with 600 grams of distilled water containing an alkyl aryl sodium sulfonate surfactant ("Santomerse S") having an HLB number of 12–14. This emulsion was evaporated to remove the toluene and part of the water. During the evaporation, 59 grams, or 40%, of the copolymer coagulated from the dispersion. Moreover, the remaining dispersed copolymer separated from the water phase after standing four days. These results were found to be typical using surfactants having HLB numbers below 18.

*Example 12*

This example illustrates the effect of excessive copolymer solution viscosity in following the procedure described herein. Example 3 was repeated, using only a sufficient amount of solvent to obtain a copolymer solution viscosity of 5500 centipoise at 60° C. The resulting dispersion separated on standing, and also yielded very poor quality films.

What is claimed is:

1. The process for preparing a storage-stable aqueous dispersion of an ethylene copolymer comprising:
   (a) dissolving a copolymer comprising 30 to 95% by weight copolymerized ethylene and 5 to 70% by weight of at least one copolymerized polar monomer in a sufficient amount of a water-immiscible organic solvent having a boiling point of 40° to 160° C. to form a solution having a viscosity of 10 to 5000 centipoise measured at 60° C.;
   (b) emulsifying said solution in a mixture of water containing a dissolved surfactant having an HLB number of at least 18, the amount of surfactant being 1 to 5% based on the weight of said copolymer; and thereafter,
   (c) evaporating said solvent from the resulting emulsion.

2. The process for preparing a storage-stable aqueous dispersion of an ethylene copolymer comprising:
   (a) dissolving a copolymer comprising 30 to 95% by weight of copolymerized ethylene and 5 to 70% by weight of copolymerized vinyl acetate, in a sufficient amount of a water-immiscible organic solvent having a boiling point of 40° to 160° C. to form a solution having a viscosity of 10 to 5000 centipoise measured at 60° C.;
   (b) emulsifying said solution in a mixture of water containing a dissolved anionic surfactant having an HLB number of at least 18, the amount of surfactant being 1 to 5% based on the weight of said copolymer; and thereafter,
   (c) evaporating said solvent from the resulting emulsion.

3. The process for preparing a storage-stable aqueous dispersion of an ethylene copolymer comprising:
   (a) dissolving a copolymer comprising 60 to 82% by weight of copolymerized ethylene and 18 to 40% by weight of copolymerized vinyl acetate, in a sufficient amount of a water-immiscible organic solvent having a boiling point of 80° to 120° C. to form a solution having a viscosity of 100 to 200 centipoise measured at 60° C.;
   (b) emulsifying said solution in a mixture of water containing a dissolved anionic surfactant having an HLB number of at least 18, the amount of surfactant being 1 to 5% based on the weight of said copolymer; and thereafter,
   (c) evaporating said solvent from the resulting emulsion.

References Cited

UNITED STATES PATENTS

| | | | |
|---|---|---|---|
| 2,238,956 | 4/1941 | Strother | 260—29.6 |
| 2,313,144 | 3/1943 | Gomm | 260—29.6 |
| 2,595,797 | 5/1952 | Leyonmark et al. | 260—29.6 |

MURRAY TILLMAN, *Primary Examiner.*

W. J. BRIGGS, *Assistant Examiner.*